United States Patent [19]
Parker et al.

[11] Patent Number: 4,626,846
[45] Date of Patent: Dec. 2, 1986

[54] BUS ARRANGEMENT FOR ADDRESSING EQUIPMENT UNITS AND A METHOD THEREFOR

[75] Inventors: Jay S. Parker, Ann Arbor; Leo B. Koziol, Canton, both of Mich.

[73] Assignee: Northern Telecom Limited, Montreal, Canada

[21] Appl. No.: 613,062

[22] Filed: May 22, 1984

[51] Int. Cl.$^4$ .......................... H04Q 1/00; H04Q 3/00
[52] U.S. Cl. ............................... 340/825.52; 340/825; 370/85
[58] Field of Search ............. 340/825, 825.07, 825.52, 340/825.83, 825.05, 825.84; 370/85, 92; 375/36; 307/202.1, 465; 361/409, 410

[56] References Cited

U.S. PATENT DOCUMENTS 4,016,369  4/1977  Pedersen .......................... 340/825.52
4,253,087  2/1981  Saal ...................................... 361/409

OTHER PUBLICATIONS

Digital Logic Theory & Practice, Brice Ward, p. 136, Tab Books, 1972.
Basic Digital Electronics—Understanding Number Systems, Boolean Algebra and Logic Circuits, Ray Ryan, pp. 69–73, Tab Books, 1975.

Primary Examiner—Ulysses Weldon
Assistant Examiner—Ralph Smith
Attorney, Agent, or Firm—Schwartz, Jeffery, Schwaab, Mack, Blumenthal & Evans

[57] ABSTRACT

A bus arrangement for providing equipment units with an address is disclosed. Each individual equipment unit achieves its address automatically according to its relative physical position within the organization of the units without the need for setting any switches. In simplistic terms, this is achieved by providing at each unit, modification of the bus leads. This includes the termination of one lead, the addition of one lead, and the relative repositioning of the other leads.

15 Claims, 5 Drawing Figures

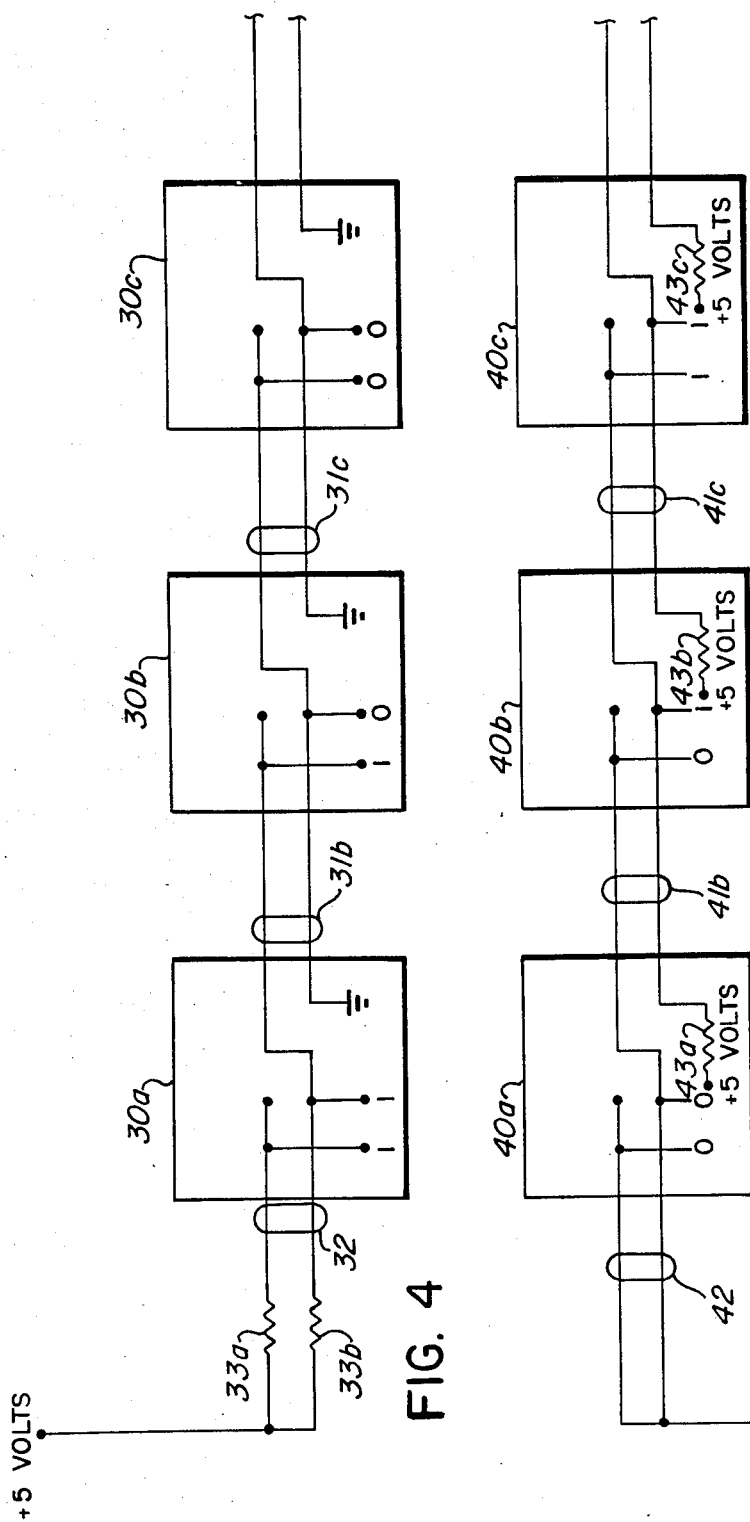

BUS ARRANGEMENT FOR ADDRESSING EQUIPMENT UNITS AND A METHOD THEREFOR

BACKGROUND OF THE INVENTION

This invention relates generally to a bus arrangement for providing equipment units with an address and more particularly to a a bus arrangement wherein each individual unit achieves its address automatically according to its relative physical position within the organization of the equipment units without the need for setting any switches (or the like).

It is common practice, when installing equipment, to give each equipment unit an address. In this manner, each inividual unit can be uniquely addressed and controlled independently of the other equipment units. In the past this addressing has been achieved by the use of small switches, for example DIP switches, on each equipment unit. A unique address is then given to each equipment unit by setting the switches to appropriate positions. As would be expected, this method of setting the addresses for the various equipment units is both time consuming and prone to operator error.

SUMMARY OF THE INVENTION

The present invention is directed to automatically providing an address for each equipment unit as it is connected to other equipment units and thereby reducing the chance of operator error.

More specifically, the present invention employs a novel bus to assign a unique address to each of a plurality of equipment units;. This bus is the same in each equipment unit. The input side (entry port) of the bus receives signals from an adjacent equipment unit and transfers these signals to an output termination (exit port). In the process of doing this, the bus is modified such that one input lead becomes terminated and a ground lead is picked up. This will be explained in more detail in the figures accompanying this description.

States in other terms, the present invention is a bus arrangement for interconnecting a plurality of equipment units in such a fashion that each unit is given a unique address, dependent solely upon its relative position to other equipment units in the interconnection, the bus arrangement in each unit comprising: an entry port having N terminals, N being a positive integer equal to or greater than two; an exit port having N terminals corresponding respectively to the N terminals of the entry port, wherein the 2nd to $N^{th}$ terminals of the entry port are connected to the 1st to $(N-1)^{th}$ terminals, respectively, of the exit port, and an originating connection is made to the $N^{th}$ terminal of the exit port.

BRIEF DESCRIPTION OF THE DRAWINGS

The present invention will now be described in more detail with reference to the accompanying drawings wherein like parts in each of the several figures are identified by the same reference character, and wherein:

FIG. 3 depicts the arrangement of slots within one of these equipment units or racks;

FIG. 4 depicts a first variation of the FIG. 1 embodiment; and

FIG. 5 depicts a second variation of the FIG. 1 embodiment.

DETAILED DESCRIPTION

Figure 1:
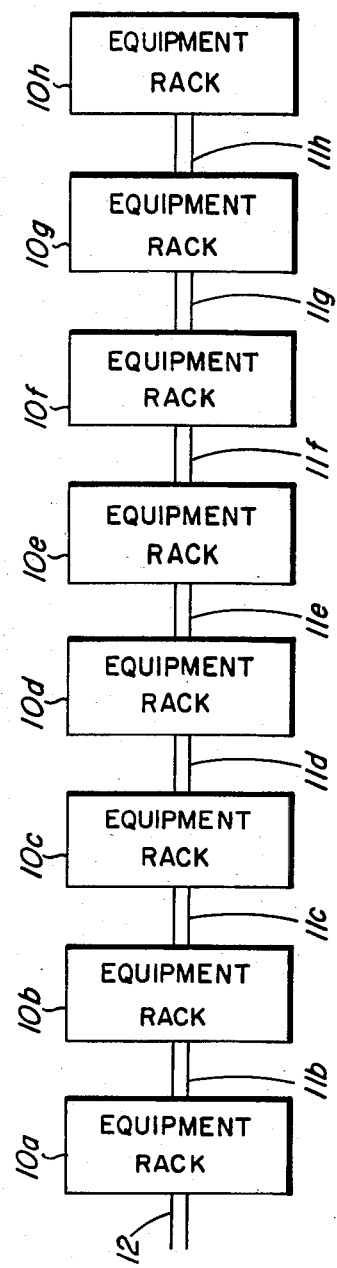
FIG. 1 depicts eight equipment units or racks interconnected according to the present invention.

FIG. 1 depicts eight equipment racks 10a through 10h and referred to collectively as equipment racks (or equipment units) 10. Equipment racks 10a through 10h are interconnected with buses 11b through 11h respectively as shown in FIG. 1. Buses 11b through 11h are referred to collectively as buses 11 and are identical one with another. Bus 12 applies the initial bus to rack 10a as shown. It should be noted in FIG. 1 that each equipment rack 10 receives its address according to its position relative to bus 12; that is, rack 10a achieves a particular address because it is the rack that receives bus 12. Equipment rack 10b receives its address because it is the one connected to rack 10a. Similarly, rack 10c achieves its address solely due to the fact that it is the one connected to rack 10b etc., all the way through to 10h. This is shown in more detail in FIG. 2 to which attention is directed.

Figure 2:
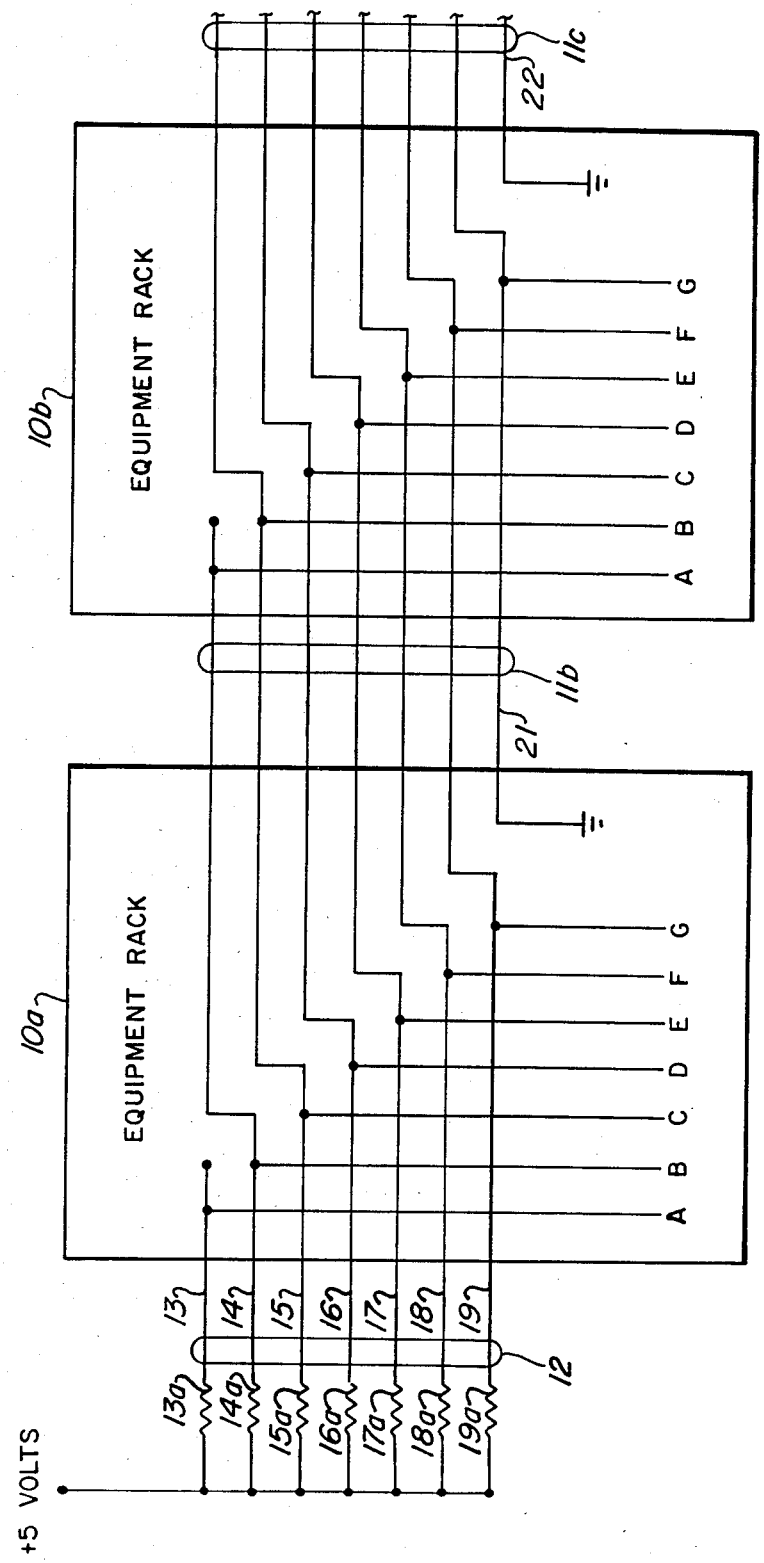
FIG. 2 depicts two equipment racks from FIG. 1 shown with their bus in more detail.

In FIG. 2, only racks 10a and 10b are depicted. The remaining racks are of course interconnected in an analogous fashion. Bus 12 is comprised of leads 13, 14, 15, 16, 17, 18 and 19 as depicted in FIG. 2 and are connected to a plus five volt supply via resistors 13a, 14a, 15a, 16a, 17a, 18a, and 19a respectively (note: each resistor 13a to 19a inclusive is 5.1 Kohms).

As depicted in FIG. 2, the address of equipment rack 10a is given in the bottom of the block as A B C D E F G which of course in this illustrative embodiment is logic 1 1 1 1 1 1 1. It will also be noted that after the address of equipment rack 10a is established, lead 13 terminates. It will also be noted that leads 14 through 19 continue through equipment rack 10a and are shifted up one place position such that when they cross to equipment rack 10b, via bus 11b, their position is one above what it was when it entered equipment rack 10a, and in addition a new lead (a ground lead) indicated as lead 21 is added. This provides an address for equipment rack 10b, once again of A B C D E F G which is now logic 1 1 1 1 1 1 0. Once again, as the leads are shifted out of equipment rack 10b, via bus 11c, we see that they are once again shifted up with the uppermost lead being dropped and a new ground lead 22 being added. Consequently, the address of equipment unit 10c, not shown in FIG. 2, will be logic 1 1 1 1 1 0 0 (etc., for the remaining equipment units). These addresses (unencoded) are depicted in more detail in Table I to which attention is directed.

TABLE I

| Equipment Rack | Unencoded Address | | | | | | | Encoded Address | | |
|---|---|---|---|---|---|---|---|---|---|---|
| | A | B | C | D | E | F | G | AA | BB | CC |
| 10a | 1 | 1 | 1 | 1 | 1 | 1 | 1 | 1 | 1 | 1 |
| 10b | 1 | 1 | 1 | 1 | 1 | 1 | 0 | 1 | 1 | 0 |
| 10c | 1 | 1 | 1 | 1 | 1 | 0 | 0 | 1 | 0 | 1 |
| 10d | 1 | 1 | 1 | 1 | 0 | 0 | 0 | 1 | 0 | 0 |
| 10e | 1 | 1 | 1 | 0 | 0 | 0 | 0 | 0 | 1 | 1 |
| 10f | 1 | 1 | 0 | 0 | 0 | 0 | 0 | 0 | 1 | 0 |
| 10g | 1 | 0 | 0 | 0 | 0 | 0 | 0 | 0 | 0 | 1 |
| 10h | 0 | 0 | 0 | 0 | 0 | 0 | 0 | 0 | 0 | 0 |

Consequently, it can be seen that the first rack (i.e. rack 10a) has the address of all logic 1s. Rack 10b, immediately to its right, has the address of all logic 1s followed by a single logic 0. The next rack (i.e. rack 10c) has the address of five logic 1s followed by two logic 0s; etc., until we come to rack 10h which has an address of all logic 0s. In this manner each equipment rack 10 receives a unique address dependent only upon its physical position within the assembly of racks.

As may be appreciated, the seven bit binary number used to address the racks may prove to be somewhat cumbersome. To simplify this address, an encoding scheme may be used to reduce the address to a three digit binary number within a rack 10 itself. This encoding scheme is implemented by an 8-line to 3-line encoder such as a model SN74LS148. The end result of this encoding scheme is depicted in Table I wherein there is shown both an unencoded address for each equipment rack 10 as well as an encoded address. For example, equipment rack 10a has an unencoded address of 1 1 1 1 1 1 1 and an encoded address of 1 1 1. SimilAr results for the other racks 10 can be found in Table I.

Each rack 10 may be subdivided into eight slots. These eight slots are represented in FIG. 3 with the four slots running from left to right on the top of rack 10a, being indicated as slots 1 through 4 and the four slots on the bottom of rack 10a being indicated as 5 through 8. When addressing, these slots can each have a unique address; for example, a three digit binary number running from 0 0 0 to 1 1 1. This would of course necessitate three additional lines on the address buses 11b and 11c etc., shown in FIGS. 1 and 2.

Attention is directed to Table II wherein there are depicted the unencoded addresses and the encoded addresses for the racks 10 when the slot numbers are also taken into account. As can be seen from Table II, the last three digits of each address (encoded or unencoded) is the slot address.

TABLE II

| Equipment Rack | Slot No. | Unencoded Address | Encoded Address |
|---|---|---|---|
| 10a | 1 | 1 1 1 1 1 1 1 1 | 1 1 1 1 1 1 |
| 10a | 2 | 1 1 1 1 1 1 1 0 | 1 1 1 1 1 0 |
| 10a | 3 | 1 1 1 1 1 1 0 1 | 1 1 1 1 0 1 |
| 10a | 4 | 1 1 1 1 1 1 0 0 | 1 1 1 1 0 0 |
| 10a | 5 | 1 1 1 1 1 0 1 1 | 1 1 1 0 1 1 |
| 10a | 6 | 1 1 1 1 1 0 1 0 | 1 1 1 0 1 0 |
| 10a | 7 | 1 1 1 1 1 0 0 1 | 1 1 1 0 0 1 |
| 10a | 8 | 1 1 1 1 1 0 0 0 | 1 1 1 0 0 0 |
| 10b | 1 | 1 1 1 1 1 0 1 1 1 | 1 1 0 1 1 1 |
| 10b | 2 | 1 1 1 1 1 1 0 1 1 0 | 1 1 0 1 1 0 |
| 10b | 3 | 1 1 1 1 1 0 1 0 1 | 1 1 0 1 0 1 |
| 10b | 4 | 1 1 1 1 1 0 1 0 0 | 1 1 0 1 0 0 |
| 10b | 5 | 1 1 1 1 1 0 0 1 1 | 1 1 0 0 1 1 |
| 10b | 6 | 1 1 1 1 1 0 0 1 0 | 1 1 0 0 1 0 |
| 10b | 7 | 1 1 1 1 1 0 0 0 1 | 1 1 0 0 0 1 |
| 10b | 8 | 1 1 1 1 1 0 0 0 0 | 1 1 0 0 0 0 |
| 10c | 1 | 1 1 1 1 1 0 0 1 1 1 | 1 0 1 1 1 1 |
| 10c | 2 | 1 1 1 1 1 0 0 1 1 0 | 1 0 1 1 1 0 |
| 10c | 3 | 1 1 1 1 1 0 0 1 0 1 | 1 0 1 1 0 1 |
| 10c | 4 | 1 1 1 1 1 0 0 1 0 0 | 1 0 1 1 0 0 |
| 10c | 5 | 1 1 1 1 1 0 0 0 1 1 | 1 0 1 0 1 1 |
| 10c | 6 | 1 1 1 1 1 0 0 0 1 0 | 1 0 1 0 1 0 |
| 10c | 7 | 1 1 1 1 1 0 0 0 0 1 | 1 0 1 0 0 1 |
| 10c | 8 | 1 1 1 1 1 0 0 0 0 0 | 1 0 1 0 0 0 |
| 10d | 1 | 1 1 1 1 0 0 0 1 1 1 | 1 0 0 1 1 1 |
| 10d | 2 | 1 1 1 1 0 0 0 1 1 0 | 1 0 0 1 1 0 |
| 10d | 3 | 1 1 1 1 0 0 0 1 0 1 | 1 0 0 1 0 1 |
| 10d | 4 | 1 1 1 1 0 0 0 1 0 0 | 1 0 0 1 0 0 |
| 10d | 5 | 1 1 1 1 0 0 0 0 1 1 | 1 0 0 0 1 1 |
| 10d | 6 | 1 1 1 1 0 0 0 0 1 0 | 1 0 0 0 1 0 |
| 10d | 7 | 1 1 1 1 0 0 0 0 0 1 | 1 0 0 0 0 1 |
| 10d | 8 | 1 1 1 1 0 0 0 0 0 0 | 1 0 0 0 0 0 |
| 10e | 1 | 1 1 1 0 0 0 0 1 1 1 | 0 1 1 1 1 1 |
| 10e | 2 | 1 1 1 0 0 0 0 1 1 0 | 0 1 1 1 1 0 |
| 10e | 3 | 1 1 1 0 0 0 0 1 0 1 | 0 1 1 1 0 1 |
| 10e | 4 | 1 1 1 0 0 0 0 1 0 0 | 0 1 1 1 0 0 |
| 10e | 5 | 1 1 1 0 0 0 0 0 1 1 | 0 1 1 0 1 1 |
| 10e | 6 | 1 1 1 0 0 0 0 0 1 0 | 0 1 1 0 1 0 |
| 10e | 7 | 1 1 1 0 0 0 0 0 0 1 | 0 1 1 0 0 1 |
| 10e | 8 | 1 1 1 0 0 0 0 0 0 0 | 0 1 1 0 0 0 |
| 10f | 1 | 1 1 0 0 0 0 0 1 1 1 | 0 1 0 1 1 1 |
| 10f | 2 | 1 1 0 0 0 0 0 1 1 0 | 0 1 0 1 1 0 |
| 10f | 3 | 1 1 0 0 0 0 0 1 0 1 | 0 1 0 1 0 1 |
| 10f | 4 | 1 1 0 0 0 0 0 1 0 0 | 0 1 0 1 0 0 |
| 10f | 5 | 1 1 0 0 0 0 0 0 1 1 | 0 1 0 0 1 1 |
| 10f | 6 | 1 1 0 0 0 0 0 0 1 0 | 0 1 0 0 1 0 |
| 10f | 7 | 1 1 0 0 0 0 0 0 0 1 | 0 1 0 0 0 1 |
| 10f | 8 | 1 1 0 0 0 0 0 0 0 0 | 0 1 0 0 0 0 |
| 10g | 1 | 1 0 0 0 0 0 0 1 1 1 | 0 0 1 1 1 1 |
| 10g | 2 | 1 0 0 0 0 0 0 1 1 0 | 0 0 1 1 1 0 |
| 10g | 3 | 1 0 0 0 0 0 0 1 0 1 | 0 0 1 1 0 1 |
| 10g | 4 | 1 0 0 0 0 0 0 1 0 0 | 0 0 1 1 0 0 |
| 10g | 5 | 1 0 0 0 0 0 0 0 1 1 | 0 0 1 0 1 1 |
| 10g | 6 | 1 0 0 0 0 0 0 0 1 0 | 0 0 1 0 1 0 |
| 10g | 7 | 1 0 0 0 0 0 0 0 0 1 | 0 0 1 0 0 1 |
| 10g | 8 | 1 0 0 0 0 0 0 0 0 0 | 0 0 1 0 0 0 |
| 10h | 1 | 0 0 0 0 0 0 0 1 1 1 | 0 0 0 1 1 1 |
| 10h | 2 | 0 0 0 0 0 0 0 1 1 0 | 0 0 0 1 1 0 |
| 10h | 3 | 0 0 0 0 0 0 0 1 0 1 | 0 0 0 1 0 1 |
| 10h | 4 | 0 0 0 0 0 0 0 1 0 0 | 0 0 0 1 0 0 |
| 10h | 5 | 0 0 0 0 0 0 0 0 1 1 | 0 0 0 0 1 1 |
| 10h | 6 | 0 0 0 0 0 0 0 0 1 0 | 0 0 0 0 1 0 |
| 10h | 7 | 0 0 0 0 0 0 0 0 0 1 | 0 0 0 0 0 1 |
| 10h | 8 | 0 0 0 0 0 0 0 0 0 0 | 0 0 0 0 0 0 |

FIG. 4 depicts a further arrangement of three equipment racks 30a, 30b, and 30c referred to collectively as racks 30. The principle of operation is the same as the FIG. 2 embodiment. The difference is that the interconnecting buses (i.e. buses 31b and 31c) along with input bus 32 have only two leads. As a result, only three addresses can be provided; namely logic 11, logic 10, and logic 00.

As shown in FIG. 4, rack 30a achieves an address of logic 11, rack 30b achieves an address of logic 10, and rack 30c achieves an address of logic 00. Input bus 32 is connected to a plus five volt supply via 5.1 Kohm resistors 33a and 33b.

FIG. 5 is similar to FIG. 4 except that input bus 42 is logic 0 (i.e. ground, instead of plus five volts). Consequently, the address of rack 40a is logic 00. Interconnecting bus 41b joins racks 40a and 40b, and interconnecting bus 41c joins racks 40b and 40c. The address of rack 40b is logic 01 since one lead of bus 41b applies plus five volts from resistor 43a. The address of rack 40c is logic 11 since now both leads of bus 41c carry plus five volts (from resistors 43a and 43b).

What is claimed is:

1. A bus arrangement for interconnecting a plurality of equipment units in such a fashion that each unit is given a unique address, dependent solely upon its relative position to other equipment units in said interconnection, said bus arrangement in each unit comprising:
an entry port having N terminals, N being a positive integer equal to or greater than two;
an exit port having N terminals, wherein the 2nd to $N^{th}$ terminals of said entry port are connected to the 1st to $(N-1)^{th}$ terminals, respectively, of said exit port, and an originating connection is made to the $N^{th}$ terminal of said exit port so as to apply a signal having a fixed predetermined logical value to said $N^{th}$ terminal of said exit port.

2. The bus arrangement of claim 1 wherein said originating connection is a ground connection.

3. The bus arrangement of claim 1 wherein said originating connection is a connection to a supply of voltage.

4. The bus arrangement of claim 1 wherein N equals seven.

5. The bus arrangement of claim 1 wherein N equals two.

6. The bus arrangement of claim 2 wherein said equipment units are interconnected in an order, each unit except the last unit in said order having a bus connecting each terminal of its exit port to a corresponding terminal of the entry port of the next unit in said order, and the first unit in said order having a bus supplying a fixed predetermined voltage other than zero volts to each terminal of its entry port.

7. The bus arrangement of claim 6 wherein the voltage is plus five volts.

8. A static method of providing equipment units each having entry and exit ports with a unique address, said method comprising the steps of:
   (a) providing a bus comprising a plurality of leads in each unit;
   (b) terminating one of said plurality of leads as the bus traverses from an entry port to a corresponding exit port;
   (c) transposing others of said leads adjacent to said one lead by one position; and
   (d) adding a ground lead to the terminated position of said bus, such that the number of leads at said exit port equals the number of leads at said entry port; whereby the address of each of said units is acquired by tapping said bus between each of said entry ports and exit ports, respectively.

9. The method of claim 8 wherein said address is acquired by tapping said bus at a point before said one lead is terminated and before said one ground lead is added.

10. The method of claim 9 wherein said equipment units are interconnected in an order, each unit except the last unit in saod order having a bus connecting each terminal of its exit port to a corresponding terminal of the entry port of the next unit in said order, and the first unit in said order having a bus supplying a fixed predetermined voltage level other than zero volts to each terminal of its entry port.

11. The method of claim 10 wherein said first unit in said order has a bus supplying approximately plus five volts to each terminal of its entry port.

12. An interconnection bus for identifying a plurality of equipment units each having an N terminal entry port and an N terminal exit port, comprising:
   a first supply means for supplying a first fixed binary logical value to the N entry port terminals of a first one of said plurality of equipment units;
   a first connecting means for connecting (N−1) terminals of said first equipment unit entry port to (N−1) terminals of said first equipment unit exit port;
   a second supply means for supplying an originating connection having a fixed binary logical value to one terminal of said exit port; and
   a second connecting means for connecting said first equipment unit exit port to the entry port of a second equipment unit.

13. The interconnection bus of claim 12, wherein said first fixed binary value provides a logical "1" to each entry port terminal of said first equipment unit; and
   wherein said originating connection provides a logical "0" to said one terminal of said first equipment unit exit port.

14. The interconnection bus of claim 12, wherein said first fixed binary value provides a logical "0" to each entry port terminal of said first equipment unit; and
   wherein said originating connection provides a logical "1" to said one terminal of said first equipment unit exit port.

15. The interconnection bus of claim 12, wherein a logical value of "1" is defined as five volts and wherein a logical value of "0" is defined as a ground connection.

* * * * *